May 8, 1928.                     1,668,926
M. SINDELL
SPARE TIRE CARRIER
Filed May 16, 1927

Inventor
Martin Sindell

By
Attorney

Patented May 8, 1928.

UNITED STATES PATENT OFFICE.

MARTIN SINDELL, OF TACOMA, WASHINGTON.

SPARE-TIRE CARRIER.

Application filed May 16, 1927. Serial No. 191,715.

This invention relates to devices for carrying spare tires, and other accessories or tools, on an automobile, and comprises a receptacle adapted to be secured to the rear of an automobile, or on the running board thereof, and having one side thereof forming a closure and so hinged that a portion thereof may be turned down over the rear bumpers of the automobile, when such bumpers are provided, and whereby, when said side is turned down over the bumper, the tires may be removed from the receptacle and the tools, etc., are readily accessible. The object of my invention is to provide a permanent receptacle in which such parts may be mounted and which can be locked, thereby keeping the tires and tools safely when not needed, but permitting quick and ready access thereto when needed, and thereby saving the time usually consumed in taking the spare tire from the protecting casing and in hunting under seats for the tire changing tools. A further object is to make such receptacle independent of the rear bumper of the automobile, on which it is mounted, so far as opening it is concerned, and yet protect it from damage by the said rear bumper. A further object is to provide an improved tire-clamp which is adjustable in position within the said receptacle and is therefore adapted for use on wheels and tires of different diameters. A further object is to combine the said tire-clamp with a tool box or basket, within the receptacle, and adapted to hold tools and other accessories.

Figure 1:
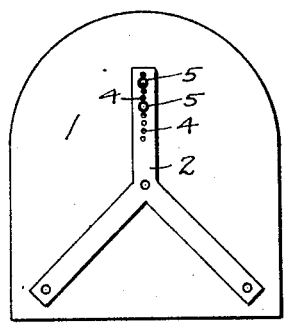
Figure 2:
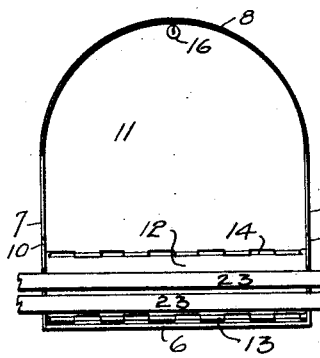
Figure 3:
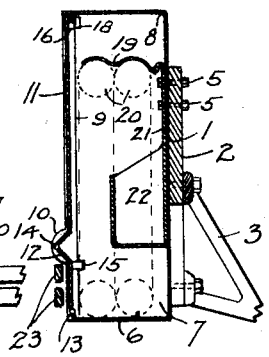
Figure 4:
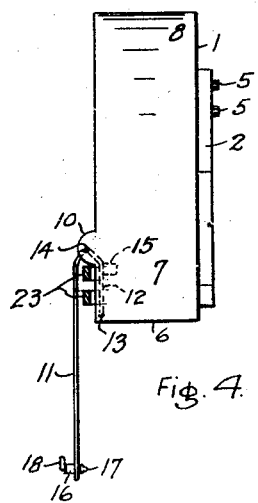
Figure 5:
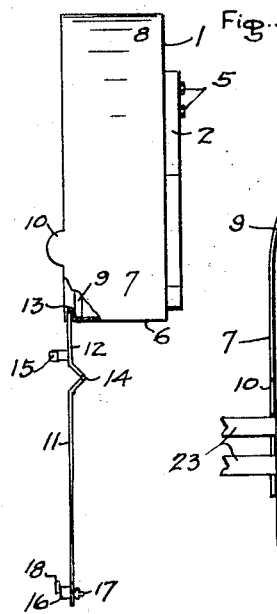
Figure 6:
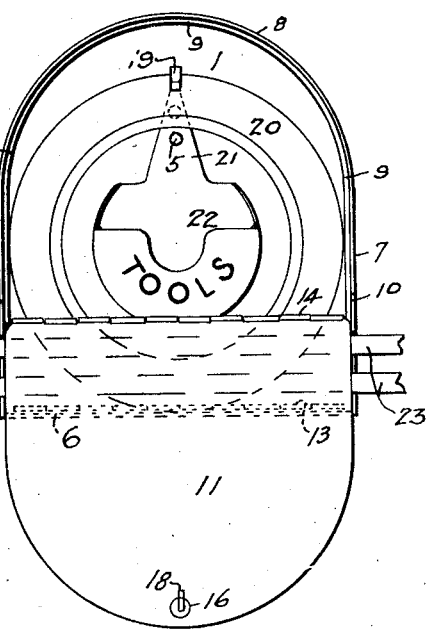
Figure 7:
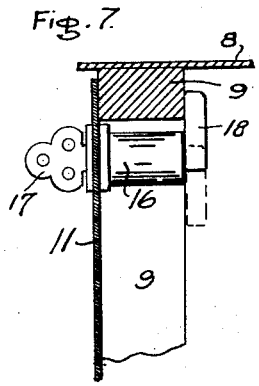
Figure 8:
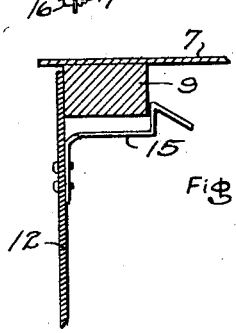
Figure 8:

I attain these and other objects by the devices, mechanisms, and arrangements illustrated in the accompanying drawings, in which: Fig. 1 is an elevation of the front side of my improved spare tire carrier, showing the means for attaching it to the rear or side of the automobile; Fig. 2 is an elevation of the rear side thereof showing a bumper passing to the rear thereof; Fig. 3 is a vertical longitudinal section thereof; Fig. 4 is a side elevation thereof showing the closure turned down on its upper hinges and passing over the rear bumpers; Fig. 5 is a similar view showing the said closure completely opened, there being no rear bumper adjacent; Fig. 6 is a rear elevation of my improved spare tire carrier showing the closure thereof opened on its upper hinges; Fig. 7 is an enlarged section taken at the upper edge thereof and showing the locking means connecting the closure with the upper end of the receptacle; and Fig. 8 is a similar view showing the latch locking the lower section of the closure to the receptacle when the upper part alone of the closure is to be used.

Similar numerals of reference refer to similar parts throughout the several views.

As readily seen in the drawings this carrier comprises a metallic receptacle or box whose front side 1 (Fig. 1) is provided with an inverted Y-shaped brace 2 adapted to be secured to a suitable bracket 3 mounted on the rear or side of the car, the said brace 2 having its upper vertical arm perforated with a plurality of holes 4, one below the other, and adapted to receive the bolts 5 which secure the tire-clamp and accessory receptacle in adjusted position within the box, as hereinafter described. This brace 2 may be secured to the front side 1 of the box in any desired manner and provides a substantial support therefor. The bottom 6, sides 7, and top 8, of the box are preferably formed integral with the said front 1 thereof. I prefer to curve the top 8 downward to form a neat connection with the sides 7, as shown in the drawings. A shaped bar 9 is secured to the inside of the said top 8 and sides 7 of the box near their rear edge and is adapted to form a stop for the rear side or closure of the said box. The edges of the two sides 7 of the box may be provided with a semi-circular extension 10, as clearly shown in the drawings, for the purpose of closing the edges of the upper joint in the rear side or closure of the box, as hereinafter described.

The rear closure of the box comprises a compound side formed of an upper section 11 and a lower section 12 hinged together, as clearly shown in the drawings. The lower edge of the lower section 12 is hinged at 13 to the bottom 6 of the box. The hinge 14, connecting the two sections 11 and 12 of the closure, is offset outward from the box. This offset may be conveniently made by bending the lower edge of the upper section 11 and the upper edge of the lower section 12 outward, as shown in the drawings. This arrangement will bring the hinge 14 substantially over the rear bumper 23, and therefore when the upper section 11 is turned on the upper hinge 14, it is offset rearward and passes down to the rear of the said bumper as clearly shown in Figs. 4 and 6. The above-mentioned extensions 10 to the edges of the sides 7 of the box protect this offset hinge 14 and keep dirt and dust from entering the box. The lower section 12 of the closure is normally kept closed, and this may be best done by means of two spring latches 15 (Figs. 3 and 8) attached to the inside of the said closure 12, near the point where it is bent outward as above-described, and extending inward therefrom a sufficient distance to engage the inner side of the above-described bar 9, as shown in Fig. 8. When it is desired to open this lower section 12, the upper section 11 is first opened and then these latches 15 may be released from engagement with the said bar 9 and the lower section 12 then turned on its lower hinge 13. The upper section 11 of the closure is provided with a lock 16 (Fig. 7) of any approved kind, preferably positioned at the upper end thereof, and adapted to engage the inner side of the same bar 9 at the corresponding point. A suitable key 17 may be provided for this lock whereby its bolt 18 is turned to disengage it from the said bar 9. The said upper closure 11 may then be turned on the upper hinge 13 to provide access to the inside of the box.

As shown in Figs. 3 and 6, I provide a tire-clamp which comprises a single or double hook 19, preferably made of spring material and adapted to engage the upper edges of the tires 20 and to hold them tightly down on the bottom 6 of the box. This clamp may preferably be formed as shown in the drawings and comprises a vertical portion 21 extending downward from the said hooked upper end 19, said vertical portion 21 having bolt holes therein adapted to receive bolts 5 which pass therethrough and through the above-described bolt holes 4 in the front 1 of the box and in the above-described brace 2. By removing these bolts 5, and then passing them through other sets of holes 4, the distance between the said hooks 19 and the bottom 6 of the box may be adjusted, and therefore the said hooks 19 may be adapted for use for tires of different diameters. The lower end of this vertical portion of the tire-clamp may preferably be extended laterally and then bent around, or otherwise formed into a basket 22 adapted to receive tools and other accessories for use on the car. This basket 22 is preferably shaped to occupy a large portion of the space within the tire ring and the opening therein is readily accessible when the upper closure 11 of the box has been opened. If desired, the corners of the box may be filled with suitable receptacles for oil and gasoline, but such have not been shown herein as they are not directly connected with this invention.

It will be readily seen that in order to make a box of this character practical and yet to keep its size and weight within reasonable limits that the said box should fit fairly closely over the largest size of tire which it is desired to carry therein, and therefore the upper portion of the box is preferably semi-circular in elevation, as shown in the drawings; but on account of the fact that the rear of the box forms the closure, it is necessary to have the bottom 6 thereof straight, in order to give a sufficiently long hinge 13 between the box and the said closure, otherwise the closure would not be sufficiently firmly attached thereto. Also, it is necessary that the upper hinge 14 between the two sections 11 and 12 of the compound closure should be as long as possible, and this is obtained by making the sides 7 of the box straight and parallel.

Having therefore described my invention what I claim is:

In a spare tire carrier, the combination of a receptacle, having a rearward opening and a closure therefor hinged thereto; means mounted on the front side of said receptacle and adapted to secure said receptacle to the vehicle; a spring clamp mounted within said receptacle, on said securing means and adapted to engage the top of a spare tire and thereby to clamp the tire between it and the bottom of said receptacle; said spring clamp being extended to form a supplemental container positioned within said receptacle and within the ring formed by the tire held by said clamp.

MARTIN SINDELL.